(12) United States Patent
Weiss

(10) Patent No.: US 7,080,235 B1
(45) Date of Patent: Jul. 18, 2006

(54) DEVICE AND METHOD FOR GENERATING AND EXECUTING COMPRESSED PROGRAMS OF A VERY LONG INSTRUCTION WORD PROCESSOR

(75) Inventor: Matthias Weiss, Dresden (DE)

(73) Assignee: Systemonic AG, Dresden (DE)

( * ) Notice: Subject to any disclaimer, the term of this patent is extended or adjusted under 35 U.S.C. 154(b) by 0 days.

(21) Appl. No.: 09/868,797

(22) PCT Filed: Dec. 21, 1999

(86) PCT No.: PCT/DE99/04050

§ 371 (c)(1),
(2), (4) Date: Sep. 25, 2001

(87) PCT Pub. No.: WO00/38049

PCT Pub. Date: Jun. 29, 2000

(30) Foreign Application Priority Data

Dec. 22, 1998 (DE) .................. 198 59 389

(51) Int. Cl.
G06F 15/00 (2006.01)
G06F 15/16 (2006.01)
(52) U.S. Cl. .................. 712/24; 709/247; 712/210
(58) Field of Classification Search ........... 709/247; 712/210, 24
See application file for complete search history.

(56) References Cited

U.S. PATENT DOCUMENTS 5,253,325 A    10/1993  Clark ........................... 395/2
5,636,352 A *  6/1997  Bealkowski et al. ........ 712/208
5,652,878 A    7/1997  Craft ........................... 395/601
5,819,058 A    10/1998 Miller et al. ................ 395/386
6,704,859 B1 * 3/2004  Jacobs et al. ............... 712/237

OTHER PUBLICATIONS

Smith, M.E. Gonzalez, and Storer, J.A. Parallel algorithms for data compression. Journal of the ACM. Vol. 32, Issue 2 (Apr. 1985). pp. 344-373.*

(Continued)

*Primary Examiner*—Eddie Chan
*Assistant Examiner*—Kevin P. Rizzuto
(74) *Attorney, Agent, or Firm*—Baker Botts LLP; Manu J. Tejwani

(57) ABSTRACT

A method for controlling functional units in a processor, according to which in a configuration a sequence of primary instruction words which consists of several instruction word parts and originates from a translation of a program code is compressed and stored as a sequence of associated program words. The invention also relates to a processor system for carrying out this method. The aim of the invention is to increase operating speed in an application-specific manner while retaining a low program word width. To this end, as regards the method, a program word contains a first characteristic of a primary instruction word and instruction word parts which differentiate the primary instruction word belonging to the program word from the primary instruction word belonging to the characteristic. By means of the first characteristic contained in the program word a secondary instruction word is generated by exchanging the instruction word parts contained in the program word with those in a preceding secondary instruction word. On the system side the aim of the invention is solved by providing for the instruction word buffer to consists of a memory with optional line-by-line access.

9 Claims, 2 Drawing Sheets

OTHER PUBLICATIONS

Weiss et al., "Dynamic Codewith Reduction for VLIW Instruction Set Architectures in Digital Signal Processors", Nov. 1996.

Lefurgy et al., "Improving Code Density Using Compression Techniques", Dec. 1997.

* cited by examiner

DEVICE AND METHOD FOR GENERATING AND EXECUTING COMPRESSED PROGRAMS OF A VERY LONG INSTRUCTION WORD PROCESSOR

CROSS REFERENCE TO RELATED APPLICATIONS

This application claims the benefit of German Patent Application No. 198 59 389.9 filed Dec. 22, 1998 and International Patent Application No. PCT/DE/04050 filed Dec. 21, 1999, both of which applications are hereby incorporated by reference in their entireties herein.

FIELD OF THE INVENTION

The invention relates to a method for controlling functional units in a processor, according to which, in a configuration, a sequence of primary instruction words consisting of multiple instruction word parts and originating from a translation of a program code is compressed and stored as a sequence of related program words. In a subsequent execution phase, sequential secondary instruction words consisting of a plurality of instruction word parts and having the full instruction word width needed to control all functional units are generated from the sequence of program words.

The invention also relates to a processor arrangement for carrying out the method having functional units, an instruction word memory associated with these functional units and an instruction word buffer for storing instruction words that have already been generated and have a width that is at least the size of the bit width of the secondary instruction word.

BACKGROUND OF THE INVENTION

Processor arrangements of the aforementioned type contain functional units that operate in parallel to one another and that are controlled at every clock cycle by an instruction word. The particular instruction word is extracted from a program word that is taken from a program memory.

For their part, the instruction words consist of a plurality of instruction word parts, where each individual instruction word part serves to control one functional unit.

To improve the performance of processor arrangements, the goal is an increase in the processing width, which makes it necessary to increase the number of functional units. In general, this increases the bit width of the instruction words and thus also of the program words. The consequence of this is the provision of corresponding storage space in the program memory, which occupies the majority of the area on the semiconductor chip.

Since the size of the program words determines the size of the program memory, the goal is to reduce the size of the program words in order to reduce the need for memory space. A number of compression methods for this purpose are known. The most obvious method is described in the report by H. Weiss and G. Fettweis, [in English:] "Dynamic Codewidth Reduction for VLIW Instruction Set Architectures in Digital Signal Processors" (Proceedings of the 3rd International Workshop on Signal and Image Processing IWSIP '96, pages 517 to 520).

In this method, the program words are assembled from sequential primary instruction words in such a way that secondary instruction words can be subsequently reproduced therefrom in that a secondary instruction word (VLIW), once it has been created, is written to an instruction word memory, and, in order to produce the next secondary instruction word, only those instruction word parts in the stored secondary instruction word are exchanged which differ between the stored secondary instruction word and the secondary instruction word to be generated. Consequently, the program word need only contain the information specifying which instruction word part differs and with what content it differs.

It is thus possible to design the program words to be very narrow and thus save memory space.

However, when there are great differences between the stored secondary instruction word and the secondary instruction word to be created, the width of the program word must be increased if these relatively great differences occur frequently, which entails the disadvantage of a relatively large memory space, or else the differences must be distributed over multiple program words. Thus, the secondary instruction word must be created from multiple program words over multiple clock cycles. This results in the disadvantage that it requires a relatively long time.

Consideration is now being given to ways of overcoming this disadvanatge. In particular, attention is directed to specific ways of increasing the operating speed in an application while retaining a small program word widths.

SUMMARY OF THE INVENTION

Systems and method for increasing operating speed in an application are provided while retaining a small program word width.

As regards the method, the object is attained in that, as the result of the configuration a program word contains a first characteristic of a primary instruction word from a first group of preceding primary instruction words which has the greatest degree of correspondence with the primary instruction word associated with the program word, and contains instruction word parts which differentiate the primary instruction word belonging to the program word from the primary instruction word belonging to the characteristic. In the execution phase, a second group—corresponding in number to the first group—of secondary instruction words, each of which is equipped with a second characteristic, is stored. By means of the first characteristic contained in the program word, a secondary instruction word corresponding to the associated primary instruction word is ascertained from the second group via the associated second characteristic, and the secondary instruction word corresponding to the program word is generated in that the instruction word parts contained in the program word are exchanged in the secondary instruction word from the secondary group.

As early as the configuration phase, the program words can be constructed such that they contain only the minimum possible information for later generation of a secondary instruction word in the execution phase. This is achieved by referring back to the preceding primary instruction words that have the greatest correspondence with the primary instruction word to be configured. Since the secondary instruction words are to be generated during the execution phase with the same width and in the same sequence as the primary instruction words, the execution phase proceeds essentially in the reverse order to the configuration phase, and the already generated secondary instruction words corresponding to the primary instruction word most similar in the configuration phase to a current primary instruction word are used one at a time to generate a new secondary instruction word. Since the instruction word with the greatest similarity or the greatest correspondence is always referred back to, the amount of information necessary to generate a new secondary instruction word can be kept as small as possible. In this way, it is possible to minimize the storage requirement of a program memory.

In one embodiment of the method, provision is made for the first group to consist of a first number of primary instruction words directly preceding the primary instruction word in question. The second group consists of a second number of secondary instruction words that is at least equal to the first number, where, prior to the generation of the next sequential secondary instruction word, the most recent secondary instruction word is appended to the group as the last word, and the first secondary instruction word to have been added that is in excess of the second number is removed from the second group. The group thus always consists of the immediately preceding instruction words, one of which has a greatest possible similarity when the instruction words within a group differ in content.

Another possible embodiment of the method is for the newly generated secondary instruction word to be appended to the second group in that this word is stored in place of the secondary instruction word that was used to generate it.

This variant of the process precludes the possibility of the group filling up with instruction words having the same content when the same function is passed through multiple times.

Another possibility is that the newly generated secondary instruction word is not stored. In this case, the same set of previously generated instruction words is always accessed each time a secondary instruction word is generated, which is advantageous when these stored instruction words are suitable as pattern words for the generation of other secondary instruction words, with the result that storage processes can be avoided by this means.

In one embodiment of the method, provision is made for the first characteristic to be formed as a minimum code distance between the primary instruction word belonging to the program word in question and the primary instruction word with the greatest similarity.

Another embodiment of the method provides for the second characteristic to consist of an address corresponding to the first characteristic that is the address of a preceding secondary instruction word in a memory used for storage of the second group.

Both of these embodiments exhibit an especially simple generation of features.

A reduction in the program word width, and thus an associated reduction in the width of the program memory, can be achieved in that the program word consists of a number of instruction word parts that corresponds to the number of instruction word parts to be differentiated which occurs most frequently within the configuration, and in that a plurality of program words are used to assemble secondary instruction words that require more than the number of instruction words stored in one program word for the secondary instruction word used for generation. Consequently, the width of the program memory satisfies the most common application cases, and no delay arises in the generation of secondary instruction words. Only in the relatively few cases where the number of instruction word parts to be changed exceeds the width of a program word are two or more program words required in two or more clock cycles to produce the secondary instruction word.

A further reduction in program word width can be achieved in that the instruction word parts are compressed in one program word. This is accomplished in that the bit width is reduced to the extent that it is possible to represent the most frequently occurring instruction word parts, and in that multiple program words are used when instruction word parts occur that require a greater bit width in order to be represented.

For this type of compression of the program word, it is especially useful for the width of the instruction word parts in the program word to be halved and for one or two program words to be provided for representation of the instruction word parts. For example, if the program word normally has a width of 8 bits, 256 combinations are available. However, a large number of these combinations is required only extremely rarely or not at all. Accordingly, the program word can be provided with a width of 4 bits, which is sufficient to represent the 16 most frequently occurring combinations. If a combination other than these should need to be represented, two or more program words are used for this purpose. However, since this occurs only very rarely, the savings in storage space for the program memory that is achieved is greater than the possible expenditure of time for generation of rare combinations.

The object is also achieved in accordance with the invention by a processor arrangement that is characterized in that the instruction word buffer consists of a memory with selective line-by-line access. In contrast to the prior art shown, this affords the possibility of directly accessing various stored instruction words in order to produce a new secondary instruction word. Thus, it is not necessary to use just any stored instruction word for generating a new secondary instruction word, but rather the particular stored instruction word can be used that has the greatest similarity to the secondary instruction word to be generated. Hence, the resource requirements for changes are relatively small, requiring only a small bit width for the program word, and thus a small program memory.

The invention is described in detail below with reference to an example embodiment.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Figure 1:
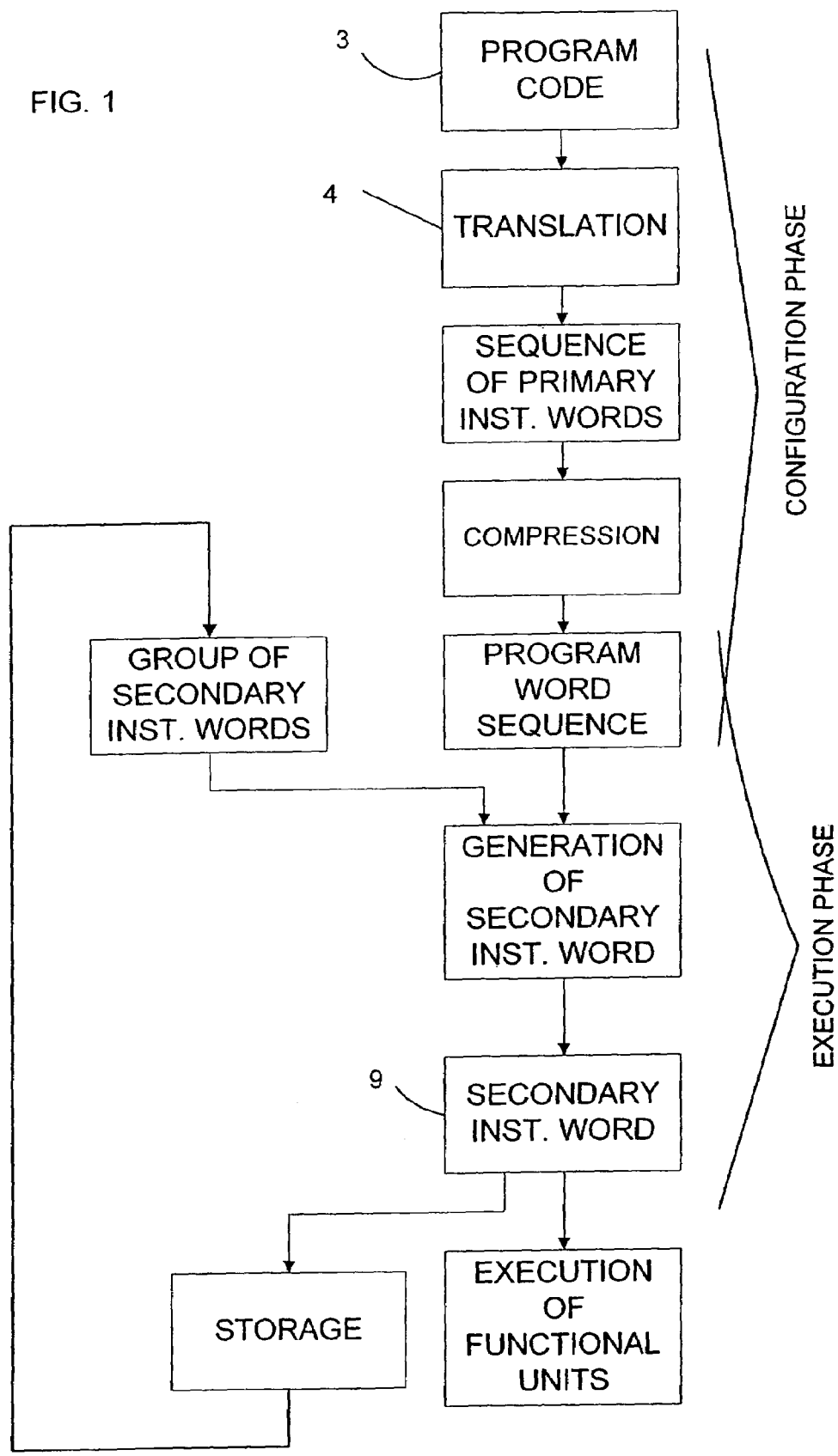
FIG. 1 is a flowchart illustrating processor and program operation in accordance with in accordance with the priciples of the present invention.
Figure 2:
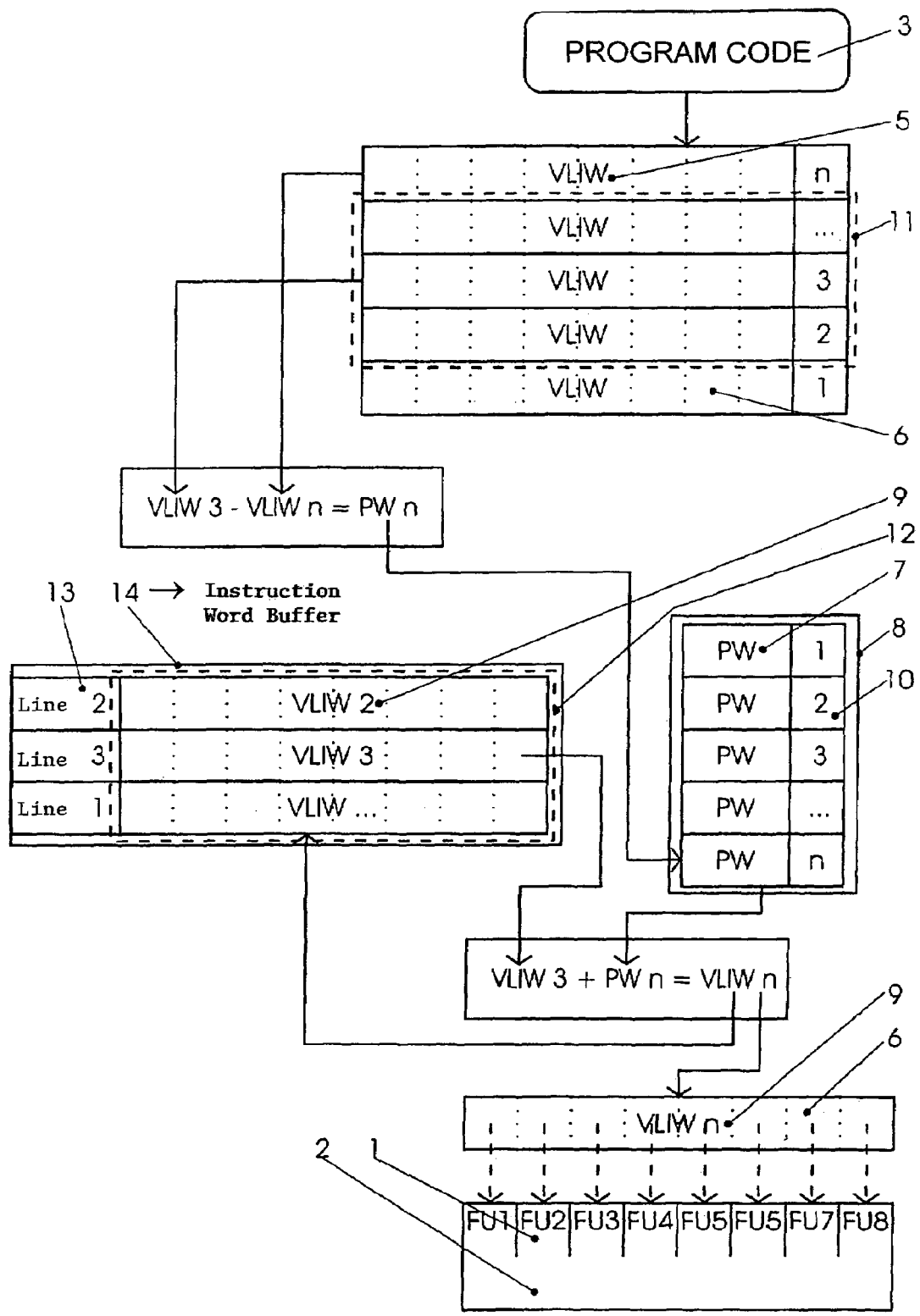
FIG. 2 is schematic illustration of structure of the primary and secondary instruction words generated in accordance with the priciples of the present invention.

The following is a list of the reference numerals and labels used in FIGS. 1 and 2

LIST OF REFERENCE NUMERALS AND LABELS 1 functional unit
2 processor
3 program code
4 translation
5 primary instruction word
6 instruction word part
7 program word
8 program memory
9 secondary instruction word
10 first characteristic
11 first group 12 second group
13 second characteristic
14 memory

DETAILED DESCRIPTION OF THE INVENTION

With reference to FIGS. 1 and 2, in the operational method for control of functional units 1 in a processor 2, a sequence of primary instruction words 5 is generated from a plurality of instruction word parts 6 from a program code 3 by means of a translation 4 in a configuration phase. This sequence of primary instruction words 5 is compressed and stored in a program memory 8 as a sequence of related program words 7.

The program words 7 consist of a number of instruction word parts 6 corresponding to the most frequently occurring number of instruction words 6 to be differentiated within the configuration. In order to compose secondary instruction words 9, more than the number of instruction word parts 6 stored in one program word 7 may be needed. Then a plurality of program words 7 are used to do so.

In a subsequent execution phase, sequential secondary instruction words 9 consisting of a plurality of instruction word parts 6 and having the full instruction word width needed to control all functional units 1 are generated from the sequence of program words 7.

In the result of the configuration, a program word 7 has a first characteristic 10 of a primary instruction word 5 from a first group 11 of preceding primary instruction words 5, which has the greatest similarity to the primary instruction word 5 associated with the program word 7, and contains instruction word parts 6 that differentiate the primary instruction word 5 belonging to the program word 7 from the primary instruction word 5 belonging to the characteristic. The first characteristic 10 is formed as a minimum code distance between the primary instruction word 5 belonging to the relevant program word 7 and the primary instruction word 5 with the greatest similarity.

In the execution phase, a second group 12 of secondary instruction words 9—corresponding in number to the first group 11—each of which is provided with a second characteristic 13, is stored. The second characteristic 13 is formed from a line number of a memory 14 that serves to store the second group 12.

By means of the first characteristic 10 contained in the program word 7, a secondary instruction word 9 corresponding to the associated primary instruction word 5 is ascertained from the second group 12 via the associated second characteristic 13. The secondary instruction word 9 corresponding to the program word is generated in that the instruction word parts 6 contained in the program word 7 are exchanged in the secondary instruction word 9 from the second group 12.

The first group 11 consists of a first number of the primary instruction words 5 preceding the primary instruction word 5 in question. The second group 12 persists of a second number of secondary instruction words 9, which is at least equal to the first number, where, prior to the generation of the next sequential secondary instruction word 9, each most recent secondary instruction word 9 can be appended to the second group 12 as the last word. The first secondary instruction word 9 to have been added that is in excess of the second number is removed from the second group 12.

What is claimed is:

1. A method for controlling functional units in a processor, the method comprising:

a configuration step, in which a sequence of primary instruction words consisting of multiple instruction word parts and originating from a translation of a program code is compressed and stored as a sequence of related program words; and a subsequent execution step, wherein sequential secondary instruction words consisting of a plurality of instruction word parts and having the full instruction word width needed to control all functional units are generated from the sequence of related program words, wherein the configuration step is configured so that a program word (7) has a first characteristic (10) of a primary instruction word (5) from a first reference group (11) of preceding primary instruction words (5), which has the greatest similarity to the primary instruction word (5) associated with the program word (7), and contains instruction word parts (6) that differentiate the primary instruction word belonging to the program word from the primary instruction word belonging to the first characteristic (10), and wherein in the subsequent execution step comprises:

storing a second group (12) of secondary instruction words (9) corresponding in number to the first reference group (11).

wherein each secondary instruction word is provided with a second characteristic (13), wherein using the first characteristic (10) contained in the program word (7), a particular secondary instruction word (9) from the second group (12) is associated with the primary instruction word (5) via the associated second; characteristic (13), and generating a specific secondary instruction word (9) corresponding to the program word (7) so that the instruction word parts (6) contained in the program word (7) are exchanged in the particular secondary instruction word (9) from the second group (12); and the second group of secondary instruction words, wherein the configuration step consists of forming and storing previously generated complete Very Long Instruction Words as the first reference group of preceding primary instruction words and the subsequent execution step comprises dynamic updating of the stored second group of secondary instruction words, and wherein the generated specific secondary instruction (9) is executed by the functional units.

2. The method in accordance with claim 1, wherein:

the first reference group (11) consists of a first number of primary instruction words (5) that directly precede the primary instruction word (5) associated with the program word (7); and the second group (12) consists of a second number of secondary instruction words (9) that is at least equal to the first number, where, prior to the generation of the next sequential secondary instruction word (9), each most recent secondary instruction word (9), is appended to the second group (12) as the last word, and the first secondary instruction word (9) to have been added and that is in excess of the second number is removed from the second group (12).

3. The method in accordance with claim 1, further comprising replacing the particular secondary instruction word (9) in the second group (12) with the newly generated specific secondary instruction word (9) in that the latter is stored in place of the secondary instruction word that was used for its generation.

4. The method in accordance with claim 2, further comprising excluding the newly generated specific secondary instruction word (9) from the store of the second group of secondary instruction words (12).

5. The method in accordance with claim 1, wherein the first characteristic (10) is formed as a minimum code distance between the primary instruction word belonging to the current program word and the primary instruction word with the greatest similarity.

6. The method in accordance with 1, wherein the second characteristic (13) comprises an address corresponding to the first characteristic that is the address of a preceding secondary instruction word in a memory (14) that is used for storage of the second group (12).

7. The method in accordance with claim 1, wherein a plurality of program words (7) are used to assemble secondary instruction words (9) that require more than the number of instruction words (9) stored in one program word (7) for the secondary instruction word (9) used for generation.

8. The method in accordance with claim 7, wherein the instruction word parts (6) are compressed in one program word (7) by reducing the bit width to the extent that it is possible to represent the instruction word parts (6), and wherein multiple program words are used when instruction word parts (6) occur that require a greater bit width in order to be represented.

9. The method in accordance with claim 8, wherein the width of the instruction word parts (6) in the program word (7) is reduced by half, and up to two program words are provided for representation of the instruction word parts (6).

* * * * *

UNITED STATES PATENT AND TRADEMARK OFFICE
CERTIFICATE OF CORRECTION

PATENT NO. : 7,080,235 B1
APPLICATION NO. : 09/868797
DATED : July 18, 2006
INVENTOR(S) : Matthias Weiss It is certified that error appears in the above-identified patent and that said Letters Patent is hereby corrected as shown below:

Column 1,
        at line 11, change "PCT/DE/04050" and insert --PCT/DE99/04050--.

Signed and Sealed this

Seventeenth Day of May, 2011

David J. Kappos
*Director of the United States Patent and Trademark Office*